US006187107B1

(12) United States Patent
Duchi et al.

(10) Patent No.: US 6,187,107 B1
(45) Date of Patent: Feb. 13, 2001

(54) MIXTURE FOR DRYING SOLIDS BY THE MOVEMENT OF WATER

(75) Inventors: Patrick Duchi, Aubonne (CH); Joseph Micozzi, Bry sur Marne (FR)

(73) Assignee: Promosol S.A. (FR)

( * ) Notice: Under 35 U.S.C. 154(b), the term of this patent shall be extended for 0 days.

(21) Appl. No.: 09/103,820

(22) Filed: Jun. 24, 1998

(30) Foreign Application Priority Data

Jun. 24, 1997 (FR) .................................................. 97 07830

(51) Int. Cl.⁷ ........................................................ B08B 3/04
(52) U.S. Cl. ................................ 134/36; 134/26; 134/27; 134/29; 134/32; 134/34; 134/42; 252/8.62; 252/194; 510/400; 510/410; 516/144
(58) Field of Search ................................ 134/26, 27, 29, 134/32, 34, 36, 42; 252/194, 358, 545, 8.62; 510/412, 400; 516/144

(56) References Cited

U.S. PATENT DOCUMENTS

| 4,401,584 | * | 8/1983 | Tajkowski et al. | 252/194 |
| 4,438,026 | * | 3/1984 | Tajkowski | 252/545 |
| 5,464,561 | * | 11/1995 | Williams et al. | 252/182.27 |
| 5,514,827 | * | 5/1996 | Petty | 556/431 |
| 5,603,776 | * | 2/1997 | Lentsch et al. | 134/25.2 |
| 5,846,454 | * | 12/1998 | Koczo et al. | 252/358 |
| 5,856,286 | * | 1/1999 | Nalewajek et al. | 510/288 |

FOREIGN PATENT DOCUMENTS

| 0 673 996 | 9/1995 | (EP) . |
| 0 787 537 | 8/1997 | (EP) . |
| 11071577 | * | 3/1999 | (JP) . |
| WO 93-10877 | 6/1993 | (WO) . |
| WO 96-12571 | 5/1996 | (WO) . |

OTHER PUBLICATIONS

Morrison et al. Organic Chemistry, Second Edition, Chapter 17. p. 560, 1966.*
CK Witco "Silicone Fluid L–45–50 E Safety Data Sheet" pp. 1–4.*
Dupont Data Sheet for "Vertrel" XF, pp. 1–6, Jun. 2000.*
Dupont "Vertrel Application and Product Guide", pp. 1–3, Dec. 1995.*
Dupont "Vertrel SMT Technical Information", pp. 1–3.*

* cited by examiner

Primary Examiner—Sharidan Carrillo
(74) Attorney, Agent, or Firm—Greenberg Traurig LLP

(57) ABSTRACT

The water-repellent mixture comprises i) a halogenated dispersant chosen from the group constituted by a totally halogenated molecule and a partially halogenated molecule with at least one atom of hydrogen and ii) a copolymeric silicone having a hydrophilic function, for drying solids by the movement of water, the copolymeric silicone preferably being a polyalkylineoxide modified polydimethylsiloxane of formula:

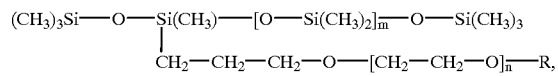

with $0 \leq m \leq 100$,
$4 \leq n \leq 50$ and
R being a radical chosen from the group of radicals constituted by a hydrogen atom, an alcohol group, an amine group and a polyalkyl group containing 1 to 5 carbon atoms.

6 Claims, No Drawings

MIXTURE FOR DRYING SOLIDS BY THE MOVEMENT OF WATER

FIELD OF THE INVENTION

The present invention is directed to compositions for drying solids. In particular, the invention is directed to compositions for drying solids, where the composition comprises a water repellent mixture of a halogenated solvent and a copolymeric silicone having a hydrophilic functional group.

BACKGROUND OF THE INVENTION

At the time of the mass manufacture of numerous types of objects it is frequently necessary to clean and dry the latter at the end of the production line. For example one can think of optical, mechanical or other parts. The cleaning operations terminate in washing and rinsing with water, but it is then necessary to eliminate the droplets of water which remain attached to the surface, in order to prevent the formation of an oxide and deposits of impurities or traces which would occur if the water was not eliminated or simply eliminated by evaporation.

In order to limit the labour costs, drying machines are used in which the objects are immersed in a bath of a product which detaches the droplets of water from the surface of the objects.

This product has low surface tension, so that it spreads by wetting over the entire surface of the objects and thus detaches the droplets of water attached to the latter. The droplets then rise to the surface of the bath, due to the difference in density, from which they are removed mechanically.

The products used hitherto for this drying operation have the drawback of being chlorinated products or chlorofluorocarbons of the CFC-113 type with the addition of a surface active agent having the effect of repelling water. It is the solvent which, having a greater wetting capacity due to the presence of the surface active agent, moves the water by detaching it from the object and without dissolving it.

Now, the use of chlorofluorocarbons is prohibited today in order to preserve the ozone layer. The applicant has thus sought to formulate a new bath free from CFC or HCFC.

SUMMARY OF THE INVENTION

The present invention is directed to a water-repellent mixture, for drying a solid having a surface with droplets of water attached to the surface by moving the droplets of water. The mixture comprises i) a halogenated solvent, selected from the group consisting of a totally halogenated molecule and a partially halogenated molecule with at least one hydrogen atom, intended to be interposed between the droplets of water and the solid surface, and to carry the droplets of water, after detachment from the solid surface, where the halogen is preferably fluorine, and ii) a copolymeric silicone having a hydrophilic function for surrounding the droplets of water, and thus controlling the interposition of the solvent between the droplets of water and the solid surface. Preferably, the copolymeric silicone is a polyalkylene oxide modified polydimethylsiloxane of formula:

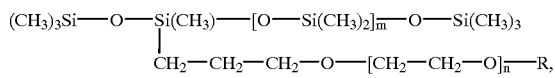

where m is 0 to 100, and n ranges from 4 to 50, and R is a radical selected from the group consisting of a hydrogen atom, an alcohol group, an amine group and a polyalkyl group containing 1 to 5 carbon atoms.

The water-repellent mixture of the invention may further comprise a co-solvent selected from the group consisting of an alkane, a siloxane, an alcohol, and an aromatic as a solvent for the copolymeric silicone. Preferably, the silicone is present in an amount of from 0.02 to 10 percent, more preferably from 0.04 to 1 percent, and most preferably from 0.1 to 0.4 percent, by weight of the total of the mixture.

DETAILED DESCRIPTION OF THE INVENTION

The present invention is directed to mixtures for drying solids by the movement of water in which the chlorofluorocarbon solvents of the prior art compositions have been replaced with new products, HFEs, hydrofluoroethers, since they have shown excellent compatibility with the environment. The molecules contain atoms of fluorine attached to carbon atoms with an ether radical, and no longer chlorine atoms on the carbon atoms. However, due to the absence of chlorine, the molecules of the solvents are practically inert for the proposed objective and it has therefore been necessary to provide an additive which is able to dissolve in these solvents, however without promoting the dissolving of the water in the latter. A series of tests with customary surface active agents, of the phosphate ester type, has been unsuccessful.

Therefore, as an additive to the HFE, the applicant has thus thought of a copolymeric silicone having one or more hydrophilic functions. It is thus this additive which, being soluble in the very wetting HFEs, exerts the main function of the mixture, by surrounding the droplets of water by a hydrophilic action and thus by enabling the solvent to move them from the surface, detaching them from the object. The HFE then has a mechanical effect for moving on the surface the droplets of water thus detached. The hydrophilic action of the copolymeric silicone, associated with the density of the solvent which is different from that of water, makes it possible to obtain a water-repelling mixture.

Additional tests have shown that additives from the family of copolymeric silicones, for a mixture with molecules other than the HFEs, was also suitable for halogenated and hydro-halogenated solvents.

Thus the invention relates to a water-repellent mixture i) of a halogenated dispersant chosen from the group constituted by a totally halogenated molecule and a partially halogenated molecule with at least one atom of hydrogen and ii) of a copolymeric silicone having a hydrophilic function, for drying solids by moving water.

The mixture of the invention may directly replace the CFC baths in existing apparatus and thus convert the latter into non-polluting apparatus as regards the ozone layer. Since its constituents are commercially available, it does not have any difficulties with supply.

The invention also relates to a method for drying a solid by the movement of a liquid, in which the solid is immersed in a bath of a first boiling solvent product, arranged to be interposed between the liquid a nd the surface of the body to which it is attached, and this interposition is controlled by means of a product having a hydrophilic function with regard to the liquid.

A preferred example of the formulation of the mixture forming a bath for drying a solid body, which is immersed therein, will now be described.

In this case, there is used as the solvent, or dispersant, a hydrofluoroether, which has the commercial reference HFE-7100 and is sold by the 3M company; it is a liquid having a density close to 1.5 which is used at its boiling temperature (60° C.). Due to the difference in density, the water droplets, after detachment, are sent to the surface of the bath.

The access of the HFE solvent to the surface where the droplets of water are attached to the solid body is facilitated by the addition of a copolymeric silicone additive having one or more hydrophilic functions. The copolymeric silicone attaches to the already accessible surface of the water droplets and, moreover, migrates by wetting to the surface of the water droplets by which they are attached to the body, that is to say the copolymeric silicone is substituted for the attachment surface of the body to be dried and thus is detached therefrom and integrated in the bath. Thus, on e immerses the solid in a bath of a product (HFE) arranged to be interposed between the liquid and the surface of the body to which it is attached and one controls this interposition by means of a product (a copolymeric silicone) having a wetting function with regard to the liquid, in this case water. The droplet t hus surrounded by the copolymeric silicone which bathes in the HFE solvent, undergoes a vertical force due to the difference in densities and is thus pushed to the surface of the mixture since, in this example, it is the HFE solvent which has the highest density. Stirring of the HFE solvent also makes it possible to disperse the droplets and to liberate those which would be trapped under the body to be dried.

The copolymeric silicone is a polyalkylene oxide modified polydimethylsiloxane of formula

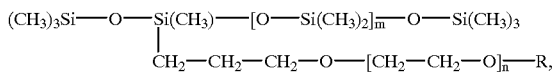

with $0 \leq m \leq 100$,
$4 \leq n \leq 50$ and
R being a radical chosen from the group of radicals constituted by a hydrogen atom, an alcohol group, an amine group and a polyalkyl group containing 1 to 5 carbon atoms.

For m equals 0, the molecule is a polyalkyline oxide modified heptamethyltrisiloxane and, for m is greater than 100, the molecule of polyalkyline modified polydimethylsiloxane is virtually insoluble in the solvent.

For n is less than 4, the hydrophilic power, exerted on the surface of the water droplets, is limited and no longer gives satisfactory results. For n exceeds 50, the solubility in the solvent becomes too low and the hydrophilic action too great.

The preferred values of n range from 6 to 10.

The molecular mass of this copolymeric silicone is from 400 to 1000 g/mole having at least 25% by weight silicone or polydimethylsiloxane.

The proportion of copolymeric silicone may vary to a large extent. The minimum threshold of effectiveness is from 0.02% by weight, with respect to the weight of the mixture, a maximum threshold of 10%, by weight, of the mixture corresponding to a wastage of the copolymeric silicone. Preferably, this proportion is comprised between 0.04% and 1% and, in an even more preferred manner, between 0.1 and 0.4%, by weight, of the mixture. Drying tests carried out with the additive at a concentration of 0.02 to 0.2% by weight with HFE-7100, hydrofluoroether or nonafluorobutyl-methylether have shown an elimination of water droplets without leaving traces.

In this example, the mixture of the HFE solvent and of copolymeric silicone furthermore comprises another solvent for the latter. This other solvent may be an alkane, a siloxane, an alcohol or even an aromatic which one first of all mixes with the copolymeric silicone, for example in equal weights, before adding the HFE.

More generally, the HFEs may be replaced by any halogenated solvent, preferably of density different from that of water. One can mention for example fluorinated and also chlorofluorinated, hydrofluorinated (HFC) or hydrochlorofluorinated (HCFC) solvents. The solvents containing chlorine have the drawback, with respect to the new solvents such as hydrofluoroethers (HFEs) and hydrofluorinated solvents (HFC) of attacking the body to be dried consisting of plastics material or elastomers.

Drying tests carried out with the copolymeric silicone additive at a concentration of 0.02% by weight with the HFC-4310mee or the 2,3-dihydrodecafluoropentane have shown the perfect elimination of water without leaving traces. In the same way, drying tests carried out with this additive at a concentration of 0.05% by weight with the HFC-4310mee have shown perfect elimination of the water without leaving traces.

Preferred embodiments of the invention have been shown and described in detail. However, the invention is not so limited, but rather is limited only by the scope of the claims.

What is claimed is:

1. A water-repellent mixture, for drying a solid having a surface with droplets of water attached to the surface by moving the droplets of water, the mixture comprising:
   i) a halogenated solvent, selected from the group consisting of a totally halogenated molecule and a partially halogenated molecule with at least one hydrogen atom, wherein the solvent is interposed between the droplets of water and the solid surface to carry the droplets of water, after detachment from the solid surface, and
   ii) a copolymeric silicone having a hydrophilic function for surrounding the droplets of water, and, thus, controlling the interposition of the solvent between the droplets of water and the solid surface, wherein the copolymeric silicone is soluble with the halogenated solvent, and is a polyalkylene oxide modified polydimethylsiloxane of formula:

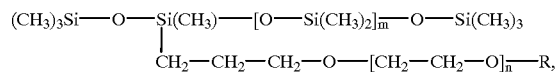

where m is 0 to 100, n ranges from 4 to 50, and R is a radical selected from the group consisting hydrogen atom, an alcohol group, an amino group and a polyalkyl group containing 1 to 5 carbon atoms.

2. The mixture according to claim 1, in which the halogenated solvent is halogenated with fluorine.

3. The mixture according to claim 1, further comprising a co-solvent selected from the group consisting of an alkane, a siloxane, an alcohol, and an aromatic.

4. The mixture according to claim 1, wherein the copolymeric silicone is present in an amount of from 0.02 to 10% by weight of the total mixture.

5. The mixture according to claim 4, wherein the copolymeric silicone is present in an amount of from 0.04 to 1% by weight of the total mixture.

6. The mixture according to claim 4, wherein the copolymeric silicone is present in an amount of from 0.1 to 0.4% by weight of the total of the mixture.

* * * * *